United States Patent
Lyu et al.

(10) Patent No.: US 11,988,333 B2
(45) Date of Patent: May 21, 2024

(54) BLADDER-TYPE PRESSURE TANK AND PREPARATION METHOD THEREOF

(71) Applicant: Xi'an Sunward Aeromat Co., Ltd., Xi'an (CN)

(72) Inventors: Guangpu Lyu, Xi'an (CN); Lijun Zhang, Xi'an (CN); Zeqiang Du, Xi'an (CN); Chaogang Zhang, Xi'an (CN); Liang Hu, Xi'an (CN); Hongshang Liu, Xi'an (CN); Xiangrong Du, Xi'an (CN); Dongshuang Li, Xi'an (CN)

(73) Assignee: XI'AN SUNWARD AEROMAT CO., LTD., Xi'an (CN)

( * ) Notice: Subject to any disclaimer, the term of this patent is extended or adjusted under 35 U.S.C. 154(b) by 66 days.

(21) Appl. No.: 17/945,061

(22) Filed: Sep. 14, 2022

(65) Prior Publication Data

US 2023/0003343 A1 Jan. 5, 2023

Related U.S. Application Data

(63) Continuation-in-part of application No. PCT/CN2021/124987, filed on Oct. 20, 2021.

(51) Int. Cl.
*F17C 1/16* (2006.01)
*B29D 22/00* (2006.01)
(Continued)

(52) U.S. Cl.
CPC .............. *F17C 1/16* (2013.01); *B29D 22/003* (2013.01); *E03B 11/08* (2013.01); *B29K 2075/00* (2013.01); *B29K 2623/06* (2013.01); *B29K 2709/08* (2013.01); *F17C 2201/018* (2013.01); *F17C 2201/032* (2013.01); *F17C 2203/0604* (2013.01); *F17C 2203/0621* (2013.01); *F17C 2203/066* (2013.01);
(Continued)

(58) Field of Classification Search
CPC ........ F17C 2201/018; F17C 2203/0604; F17C 2203/0621; F17C 2203/066; F24D 3/1016
See application file for complete search history.

(56) References Cited

U.S. PATENT DOCUMENTS 3,230,975 A * 1/1966 Mercier ................... F15B 1/10
                                                       138/30
7,637,285 B2 * 12/2009 Weber ...................... F17C 1/16
                                                       138/30
(Continued)

*Primary Examiner* — Don M Anderson
(74) *Attorney, Agent, or Firm* — MATTHIAS SCHOLL P.C.; Matthias Scholl

(57) ABSTRACT

A bladder-type pressure tank includes an outer shell, a bladder, a nozzle, and an elbow pipe. The outer shell includes a liner and a glass-fiber layer covering the outer surface of the liner. The liner includes polyethylene (PE). The liner further includes a chamber, a first opening, and a second opening. The bladder is disposed in the chamber. In an inflated state of the bladder, a gap is formed between the inflated bladder and the inner surface of the liner. The bladder includes polyurethane (PU). The nozzle is integrated with the bladder, and is disposed in the first opening and seals the first opening. The elbow pipe includes a first end and a second end. The first end of the elbow pipe is disposed in the second opening and communicates with the chamber; and the second end of the elbow pipe is configured to connect to a pipeline.

8 Claims, 1 Drawing Sheet

(51) Int. Cl.
*E03B 11/08* (2006.01)
*B29K 75/00* (2006.01)
*B29K 623/00* (2006.01)
*B29K 709/08* (2006.01)

(52) U.S. Cl.
CPC ............... *F17C 2205/0103* (2013.01); *F17C 2209/2127* (2013.01); *F17C 2223/035* (2013.01)

(56) References Cited

U.S. PATENT DOCUMENTS 10,532,527 B2 * 1/2020 Kloft .................... B29D 22/003
2012/0042976 A1 * 2/2012 Toledo ...................... F15B 1/08
138/31

* cited by examiner

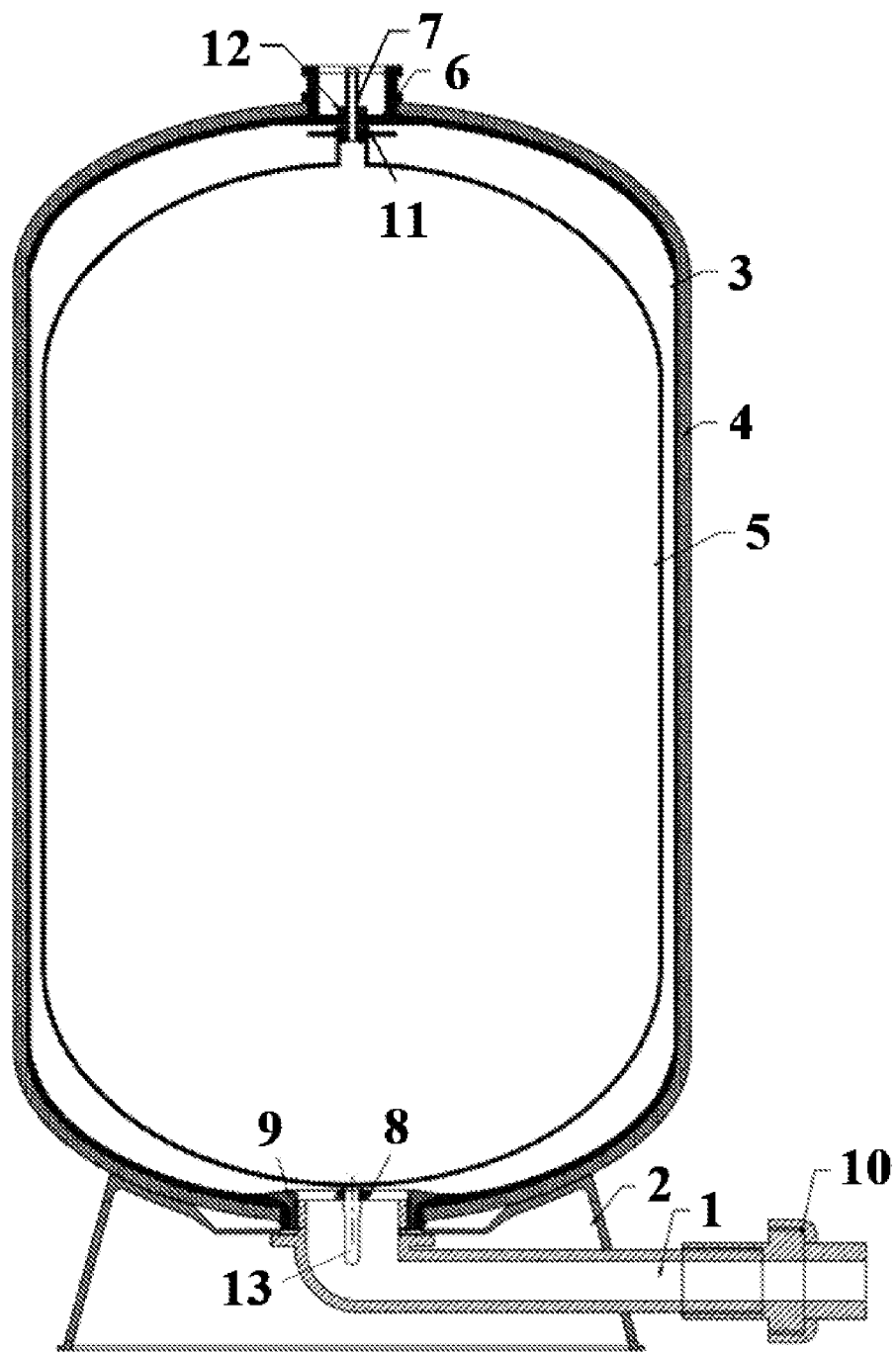

BLADDER-TYPE PRESSURE TANK AND PREPARATION METHOD THEREOF

CROSS-REFERENCE TO RELATED APPLICATIONS

This application is a continuation-in-part of International Patent Application No. PCT/CN2021/124987 with an international filing date of Oct. 20, 2021, designating the United States, and further claims foreign priority benefits to Chinese Patent Application No. 202011551294.9 filed Dec. 24, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a bladder-type pressure tank and a preparation method thereof.

Conventionally, a bladder-type pressure tank includes an outer shell and a rubber bladder. The outer shell is made of steel and the rubber bladder is disposed in the outer shell. According to Boyle's law PV=C, if the volume of the air in the bladder-type pressure tank decreases, the air pressure increases and the water flows in until the water pressure is equal to the air pressure in the bladder-type pressure tank. When the water flows out and the water pressure decreases, the air pressure in the bladder-type pressure tank is greater than the water pressure. Thus, the air expands to extrude the water in the bladder-type pressure tank until the air pressure and the water pressure are balanced. The bladder-type pressure tank is mainly used to buffer pressure fluctuations in a pipeline system and provide water to the pipeline. However, conventional bladder-type pressure tanks include steel outer shells and rubber bladders. The steel outer shells are corrosive, and the rubber bladders are fragile.

SUMMARY

One objective of the disclosure is to provide a bladder-type pressure tank; the bladder-type pressure tank comprises an outer shell, a bladder, a nozzle, and an elbow pipe; the outer shell comprises a liner and a glass-fiber layer covering an outer surface of the liner; the liner comprises polyethylene (PE); the liner further comprises a chamber, a first opening, and a second opening; the bladder is disposed in the chamber; in an inflated state of the bladder, a gap is formed between the inflated bladder and an inner surface of the liner; the bladder comprises polyurethane (PU); the nozzle is integrated with the bladder, and is disposed in the first opening and seals the first opening; the elbow pipe comprises a first end and a second end; the first end of the elbow pipe is disposed in the second opening and communicates with the chamber; and the second end of the elbow pipe is configured to connect to a pipeline.

In a class of this embodiment, the bladder-type pressure tank further comprises a fixing column integrated with the bladder; the first end of the elbow pipe comprises a fixing plate; and the fixing column is fixedly disposed through the fixing plate.

In a class of this embodiment, the first end of the elbow pipe further comprises a step; and the fixing plate is clamped in the step.

In a class of this embodiment, the fixing column is integrally formed with the bladder.

In a class of this embodiment, the second opening comprises a female thread; the first end of the elbow pipe comprises a first male thread; and the first end is embedded in the second opening through the matching of the first male thread and the female thread.

In a class of this embodiment, the first opening is disposed in a top part of the liner; the second opening is disposed in a bottom part of the liner; and the bladder-type pressure tank further comprises a saddle support fixedly disposed at a bottom portion of the outer shell to support the outer shell.

In a class of this embodiment, the second opening is surrounded by a flange; the saddle support comprises a fixing sleeve; and the fixing sleeve is fixedly disposed on the flange.

In a class of this embodiment, the bladder-type pressure tank further comprises a seal gasket disposed in the first opening; and the nozzle is disposed through the first opening and fixedly connected to the seal gasket by at least one bolt.

In a class of this embodiment, the outer shell has a maximum working pressure of 1.0 megapascal; and the bladder has a maximum working pressure of 0.2 megapascal.

In a class of this embodiment, in the inflated state, a distance between the inflated bladder and the inner surface of the liner is between 4.5 and 5.5 mm.

Another objective of the disclosure is to provide a preparation method of the bladder-type pressure tank, the method comprising: preparing the bladder by blow molding; integrally forming the nozzle with the bladder by injection molding; preparing the liner comprising the first opening and the second opening using an injection molding process; wrapping glass fiber around the outer surface of the liner to form the outer shell; fixedly disposing the bladder in an uninflated state in the liner; fixedly disposing the nozzle on the liner through the first opening; fixedly disposing the elbow pipe in the second opening; pumping inert gas through the nozzle to the bladder; and connecting the elbow pipe to the pipeline.

The following advantages are associated with the bladder-type pressure tank of the disclosure: the liner comprises high-density polyethylene (HDPE). The glass-fiber layer covers the outer surface of the liner to form the outer shell, thus increasing the compressive strength of the outer shell. The bladder comprises polyurethane (PU). The bladder and the nozzle are integrally formed and connected to each other, thus enhancing the sealing effect and the compressive strength of the bladder. A gap is formed between the bladder and the inner surface of the liner. The gap functions as a water passage that allows water to flow through when the water pressure is equal to the air pressure. The first end of the elbow pipe is disposed through the second opening and communicates with the chamber. The second end of the elbow pipe is connected to the pipeline for pressure balance and water supply. The bladder-type pressure tank offers advantages such as compressive strength, corrosion resistance, durability, and extended service life.

The fixing column communicates with the bladder; the fixing plate is fixedly disposed on the elbow pipe; the fixing column is fixedly disposed through the fixing plate so that the bladder is fixedly secured within the liner; the fixing plate is fixedly disposed on the elbow pipe through the step, which facilitates the assembly and disassembly of the fixing plate and the elbow pipe; the elbow pipe is disposed in the second opening through threads to ensure the sealing effect and the stable structural performance.

The saddle support is configured to support the outer shell to prevent the outer shell from moving out of place. The second opening is connected through the fixing sleeve to the saddle support thus ensuring the stable structural performance.

The bladder is integrally formed by blow molding. The nozzle is formed with the bladder by injection molding. The combination of blow molding and injection molding enhances the sealing effect and compressive strength of the bladder. The liner is integrally formed by blow molding. The glass fiber is continuously disposed around the liner to form the outer shell with high compressive strength. The bladder-type pressure tank offers advantages such as high compressive strength, high corrosion resistance, light weight, and clean interior. The bladder is integrally formed from polyurethane (PU), which offers advantages in preparation process, sealing performance, and compressive strength over the related art.

BRIEF DESCRIPTION OF THE DRAWINGS

The disclosure is described hereinbelow with reference to accompanying drawings, in which the sole FIGURE is a perspective view of a bladder-type pressure tank according to one embodiment of the disclosure.

In the drawings, the following reference numbers are used: 1. Elbow pipe; 2. Saddle support; 3. Liner; 4. Glass-fiber layer; 5. Bladder; 6. First opening; 7. Nozzle; 8. Fixing plate; 9. Second opening; 10. Pipe union; 11. Seal gasket; 12. Bolt; and 13. Fixing column.

DETAILED DESCRIPTION

To further illustrate the disclosure, embodiments detailing a bladder-type pressure tank are described below. It should be noted that the following embodiments are intended to describe and not to limit the disclosure.

The bladder-type pressure tank of the disclosure comprises an outer shell and a bladder 5 disposed in the outer shell. The bladder-type pressure tank comprises composite materials and is used in devices such as central air conditioners, boilers, water heaters, and constant pressure variable frequency water supply equipment. The bladder-type pressure tank is configured to buffer pressure fluctuations in a pipeline system, eliminate water hammer, stabilize pressure, release extra pressure, and supplement water at night.

Referring to the sole FIGURE, a bladder-type pressure tank comprises an outer shell, a bladder 5, a liner 3, a nozzle 7, and an elbow pipe 1. The bladder 5 disposed in the outer shell. The outer shell comprises a liner 3 and a glass-fiber layer 4 covering an outer surface of the liner 3. The liner 3 comprises polyethylene (PE). The liner further comprises a chamber, a first opening 6 and a second opening 9. The bladder 5 is disposed in the chamber. In an inflated state, a gap is formed between the inflated bladder 5 and an inner surface of the liner 3. The bladder 5 comprises polyurethane (PU). The bladder 5 and the nozzle 7 are integrally formed and connected to each other. The nozzle 7 is fixedly disposed into the first opening 6. The first end of the elbow pipe 1 is disposed in the second opening 9 and communicates with the chamber. The second end of the elbow pipe 1 is configured to connect to a pipeline.

In the example, the liner 3 comprises high-density polyethylene (HDPE). The glass-fiber layer 4 covers the outer surface of the liner 3 to form the outer shell, thus increasing the compressive strength of the outer shell. The bladder 5 and the nozzle 7 are integrally formed and connected to each other, thus enhancing the sealing effect and compressive strength of the bladder 5. The gap formed between the bladder 5 and the inner surface of the liner 3 functions as a water passage that allows water to flow through when the water pressure is equal to the air pressure. The first end of the elbow pipe 1 is disposed through the second opening 9 and communicates with the chamber. The second end of the elbow pipe 1 is connected to the pipeline that requires the bladder-type pressure tank to maintain pressure and supply water. The outer shell offers advantages such as high compressive strength, high corrosion resistance, light weight, and clean interior. The bladder 5 is integrally formed from polyurethane (PU), which leads to a higher compressive strength, sealing effect, and service life of the bladder 5.

The bladder-type pressure tank further comprises a fixing column 13 integrally formed with the bladder 5. The first end of the elbow pipe 1 comprises a fixing plate 8. The fixing column 13 is fixedly disposed through the fixing plate 8. Preferably, the first end of the elbow pipe 8 further comprises a step and the fixing plate 8 is clamped in the step. Preferably, the second opening 9 comprises a female thread; the first end of the elbow pipe 1 comprises a first male thread; the first male thread is bolted to the female thread to ensure that the elbow pipe 1 is disposed in the second opening 9. The second end of the elbow pipe 1 comprises a pipe union 10 through which the elbow pipe 1 is connected to the pipeline.

In the example, the fixing column 13 is integrally formed with the bladder 5. The fixing plate 8 is fixedly disposed on the elbow pipe 1. The fixing column 13 is fixedly disposed through the fixing plate 8 so that the bladder 5 is fixedly secured within the liner 3. The fixing plate 8 is fixedly disposed on the elbow pipe 1 by the step, which facilitates assembly and disassembly of the fixing plate 8 and the elbow pipe 1. The elbow pipe 1 is disposed in the second opening through threads to ensure the sealing effect and stable structural performance.

The first opening 6 is disposed in a top part of the liner 3 and the second opening 9 is disposed in a bottom part of the liner 3. The bladder-type pressure tank further comprises a saddle support 2 disposed at a bottom portion of the outer shell. The saddle support is configured to support the outer shell. The second opening is disposed in the bottom part of the liner 3 so as to conduct water in and out of the liner 3. Preferably, the second opening 9 is surrounded by a flange; the saddle support 2 comprises a fixing sleeve; the fixing sleeve is fixedly disposed on the flange. The saddle support 2 is formed by injection of polypropylene (PP) into a mold. The saddle support further comprises a hole. The elbow pipe 1 is disposed through the hole and is disposed in the second opening through threads. The saddle support further comprises a top surface matched with the outer shell in shape, so that the outer shell and the saddle support 2 are meshed with each other. In the example, the outer shell is in the shape of a cylinder with an arc-shape bottom portion; the saddle support 2 comprises a curved surface matched with the arc-shaped bottom portion. The saddle support is configured to support the outer shell to prevent the outer shell from moving out of place. The flange is connected through the fixing sleeve to the saddle support 2 to ensure stable structural performance. The elbow pipe 1 is formed by injection of chlorinated polyvinyl chloride (CPVC) into a mold. The first end of the elbow pipe 1 further comprises an extended part fixedly connected to the saddle support 2.

Preferably, the bladder-type pressure tank further comprises and a seal gasket 11. The seal gasket 11 is disposed into the first opening 6. The nozzle 7 is disposed through the first opening 6 and fixedly connected to the seal gasket 11 by at least one bolt 12, which improves the seal performance of the bladder 5 and prevents the nozzle 7 and the bladder 5 from moving within the liner 3. The seal gasket 11 comprises rubber.

In the example, the outer shell has a maximum working pressure of 1.0 megapascal (MPa), and the bladder 5 has a maximum working pressure of 0.2 MPa. To ensure smooth air flow when the bladder 5 is inflated, a distance between the inflated bladder 5 and the inner surface of the liner 3 is between 4.5 and 5.5 mm, preferably 5 mm.

A preparation method of the bladder-type pressure tank comprises: preparing the bladder 5 by blow molding; integrally forming the nozzle 7 with the bladder 5 by injection molding; preparing the liner 3 comprising the first opening 6 and the second opening 9 using an injection molding process; wrapping glass fiber around the outer surface of the liner to form the outer shell; impregnating glass fiber into glue and wrapping the impregnated glass fiber around the outer surface of the liner 3 to form the outer shell; fixedly disposing the bladder 5 in an uninflated state in the liner 3; fixedly disposing the nozzle 7 on the liner 3 through the first opening 6; fixedly disposing the elbow pipe 1 in the second opening 9; pumping inert gas through the nozzle 7 to the bladder 5; and connecting the elbow pipe 1 to the pipeline.

Specifically, the preparation method comprises:
1. Preparation of the bladder 5: using the blow molding process to form the bladder 5 from polyurethane (PU); integrally forming the nozzle 7 with the bladder 5 by injection molding; forming the fixing column 13 with a bottom part of the bladder 5 by injection molding; and disposing the fixing plate 8 on the elbow pipe 1;
2. Preparation of the outer shell: using the blow molding process to prepare the liner 3 from polyethylene (PE); integrally forming the first opening 6 and the second opening 9 on the liner 3; disposing two flanges on the first opening 6 and the second opening 9, respectively; disposing the female thread in the second opening 9; impregnating the glass fiber into glue; and continuously wrapping the impregnated glass fiber around the outer surface of the liner 3 to form the outer shell;
3. Preparation of the saddle support 2: forming the saddle support 2 by injection of polypropylene (PP) into a mold; and disposing the hole and the fixing sleeve on the saddle support 2;
4. Preparation of the elbow pipe 1: disposing the first male thread and the step on the first opening of the elbow pipe 1; disposing a second male thread on the second opening of the elbow pipe 1; and connecting the union pipe 10 to the second opening of the elbow pipe 1 by the second male thread;
5. Assembly of the bladder-type pressure tank: deflating the bladder 5 and fixedly disposing the deflated bladder in the liner 3; fixedly disposing the nozzle 7 through the first opening 6 by at least one bolt 12; disposing the seal gasket 11 into the first opening 6 to achieve a sealing effect; fixedly disposing the fixing column 13 through the fixing plate 8; fitting the fixing plate 8 into the step; disposing the fixing sleeve on the flange of the second opening 9; disposing the elbow pipe 1 through the hole so that the first male thread is bolted to the female thread; and
6. After assembly, inflating the bladder 5 with inert gas with a pressure equal to or less than 26 psi; and connecting the bladder-type pressure tank through the pipe union 10 to the pipeline.

In the example, the liner 3 comprises high-density polyethylene (HDPE). The glass fiber is continuously disposed around the liner 3 to form the outer shell that has a maximum working pressure of 1.0 MPa. The bladder 5 is integrally formed from polyurethane (PU) through the blow molding process. The nozzle 7 is formed with the bladder 5 by injection molding. A combination of blow molding and injection molding enhances the sealing effect and compressive strength of the bladder 5, so that the bladder 5 has a maximum working pressure of 0.2 MPa. To ensure smooth air flow when the bladder 5 is inflated, a distance between the inflated bladder 5 and the inner surface of the liner 3 is 5.0 mm. The nozzle 7 is fixedly disposed in the upper part of the outer shell by at least one bolt. The seal gasket 11 comprises rubber and is configured to improve the seal performance of the bladder 5. The fixing column 13 is disposed in the bottom part of the bladder 5 and extends through the fixing plate 8 into the first end of the elbow pipe 1. The saddle support 2 is formed by injection of polypropylene (PP) into a mold. The saddle support is fixedly disposed under the bladder-type pressure tank by the elbow pipe 1. The elbow pipe 1 is formed by chlorinated polyvinyl chloride (CPVC) through injection molding. The step is disposed on the first end of the elbow pipe 8. The fixing plate 8 is clamped in the step to prevent the bladder 5 from moving out of place. The first end of the elbow pipe 1 further comprises an extended part fixedly connected to the saddle support 2. The elbow pipe 1 is disposed in the second opening through threads. The elbow pipe 1 is connected through the pipe union 10 to the pipeline.

The bladder-type pressure tank offers advantages such as simple preparation process, extended service life, light weight, and clean interior. The outer shell is corrosion resistant, and the bladder is durable and not easy to break. The bladder is integrally formed from polyurethane (PU), which leads to a higher compressive strength and sealing effect. The bladder is connected to the outer shell and the saddle support through the bolt and the step, which facilitates the assembly and disassembly of the bladder-type pressure tank. The liner comprises polyethylene (PE), which offers advantages in cleanliness and corrosion resistance over the related art. The bladder is integrally formed, which improves the compressive strength and service life of the bladder.

It will be obvious to those skilled in the art that changes and modifications may be made, and therefore, the aim in the appended claims is to cover all such changes and modifications.

The invention claimed is:
1. A bladder-type pressure tank, comprising:
   an outer shell;
   a bladder;
   a nozzle;
   an elbow pipe; and
   a saddle support;
   wherein:
   the outer shell comprises a liner and a glass-fiber layer covering an outer surface of the liner; the liner comprises polyethylene (PE); the liner further comprises a chamber, a first opening, and a second opening;
   the bladder is disposed in the chamber; in an inflated state of the bladder, a gap is formed between the inflated bladder and an inner surface of the liner; and the bladder comprises polyurethane (PU);
   the nozzle is integrated with the bladder, and is disposed in the first opening and seals the first opening;

the elbow pipe comprises a first end and a second end; the first end of the elbow pipe is disposed in the second opening and communicates with the chamber; and the second end of the elbow pipe is configured to connect to a pipeline;

a fixing column is integrated with the bladder; the first end of the elbow pipe comprises a fixing plate; and the fixing column is fixedly disposed through the fixing plate; and the first opening is disposed in a top part of the liner; the second opening is disposed in a bottom part of the liner; and the saddle support is fixedly disposed at a bottom portion of the outer shell to support the outer shell.

2. The bladder-type pressure tank of claim 1, wherein the first end of the elbow pipe further comprises a step; and the fixing plate is clamped in the step.

3. The bladder-type pressure tank of claim 1, wherein the second opening comprises a female thread; the first end of the elbow pipe comprises a first male thread; and the first end is embedded in the second opening through matching of the first male thread and the female thread.

4. The bladder-type pressure tank of claim 1, wherein the second opening is surrounded by a flange; the saddle support comprises a fixing sleeve; and the fixing sleeve is fixedly disposed on the flange.

5. The bladder-type pressure tank of claim 4, wherein the bladder-type pressure tank further comprises a seal gasket disposed in the first opening; and the nozzle is disposed through the first opening and fixedly connected to the seal gasket by at least one bolt.

6. The bladder-type pressure tank of claim 4, wherein the outer shell has a maximum working pressure of 1.0 megapascal; and the bladder has a maximum working pressure of 0.2 megapascal.

7. The bladder-type pressure tank of claim 4, wherein in the inflated state, a distance between the inflated bladder and the inner surface of the liner is between 4.5 and 5.5 mm.

8. A method of preparing the bladder-type pressure tank of claim 1, the method comprising:

preparing the bladder by blow molding; integrally forming the nozzle with the bladder by injection molding;

preparing the liner comprising the first opening and the second opening using an injection molding process; wrapping glass fiber around the outer surface of the liner to form the outer shell;

fixedly disposing the bladder in an uninflated state in the liner; fixedly disposing the nozzle on the liner through the first opening;

fixedly disposing the elbow pipe in the second opening; and pumping inert gas through the nozzle to the bladder; and connecting the elbow pipe to the pipeline.

\* \* \* \* \*